(12) United States Patent
Kura

(10) Patent No.: US 8,496,309 B2
(45) Date of Patent: Jul. 30, 2013

(54) RECORDING APPARATUS CAPABLE OF DETECTING RESIDUAL AMOUNT OF INK IN INK CARTRIDGE

(75) Inventor: Keiji Kura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 100 days.

(21) Appl. No.: 13/249,543

(22) Filed: Sep. 30, 2011

(65) Prior Publication Data

US 2012/0081424 A1 Apr. 5, 2012

(30) Foreign Application Priority Data

Sep. 30, 2010 (JP) ................................. 2010-222671

(51) Int. Cl.
*B41J 29/393* (2006.01)
*G01F 23/00* (2006.01)

(52) U.S. Cl.
CPC ...................................... *G01F 23/00* (2013.01)
USPC .................................. 347/7; 347/19; 347/86

(58) Field of Classification Search
CPC .......... G01F 23/246; G01F 23/22; G01F 23/00
USPC ........................................ 347/6, 7, 19, 84–87
See application file for complete search history.

(56) References Cited

U.S. PATENT DOCUMENTS

| | | |
|---|---|---|
| 6,399,946 B1 | 6/2002 | Hobbs |
| 6,470,744 B1 | 10/2002 | Usui et al. |
| 6,536,861 B1 | 3/2003 | Usui et al. |
| 6,799,820 B1 | 10/2004 | Usui et al. |
| 6,984,012 B2 | 1/2006 | Asauchi |
| 7,267,000 B1 | 9/2007 | Usui et al. |
| 2002/0024559 A1 | 2/2002 | Murray et al. |
| 2002/0170353 A1 | 11/2002 | Usui et al. |
| 2003/0043216 A1 | 3/2003 | Usui et al. |
| 2003/0140694 A1 | 7/2003 | Usui et al. |
| 2005/0068389 A1 | 3/2005 | Katayama et al. |

(Continued)

FOREIGN PATENT DOCUMENTS

| | | |
|---|---|---|
| EP | 1164022 A2 | 12/2001 |
| EP | 1792733 A1 | 6/2007 |

(Continued)

OTHER PUBLICATIONS

European Patent Office, extended European Search Report for European Patent Application No. 11183575.7 (counterpart to above-captioned patent application), dated Dec. 27, 2011.

(Continued)

*Primary Examiner* — Julian Huffman
(74) *Attorney, Agent, or Firm* — Baker Botts L.L.P.

(57) ABSTRACT

A recording apparatus includes a controller and a cartridge accommodating section in which an ink cartridge of a predetermined type is mountable. The ink cartridge includes: an ink chamber; a first heat conductor that conducts heat to the ink; a pyroelectric portion that outputs an electrical signal; and a first electrical interface that connects to the pyroelectric portion. The cartridge accommodating section includes: a second electrical interface that connects to the first electrical interface when the ink cartridge is mounted in the cartridge accommodating section; a heater that applies heat; and a second heat conductor that conducts heat to the first heat conductor. The controller determines at least one of the type of the mounted ink cartridge and whether an amount of ink in the ink chamber is less than a predetermined amount based on the electrical signal inputted from the pyroelectric portion via the second electrical interface.

5 Claims, 14 Drawing Sheets

U.S. PATENT DOCUMENTS

| | | |
|---|---|---|
| 2005/0162490 A1 | 7/2005 | Katayama et al. |
| 2006/0001714 A1 | 1/2006 | Usui et al. |
| 2006/0007283 A1 | 1/2006 | Sacco, Jr. et al. |
| 2006/0033789 A1 | 2/2006 | Sasaki et al. |
| 2006/0050098 A1 | 3/2006 | Kim |
| 2006/0164482 A1 | 7/2006 | Katayama et al. |
| 2006/0272404 A1 | 12/2006 | Usui et al. |
| 2007/0091154 A1 | 4/2007 | Katayama et al. |
| 2007/0126770 A1 | 6/2007 | Asauchi |
| 2007/0277603 A1 | 12/2007 | Usui et al. |
| 2007/0291088 A1 | 12/2007 | Katayama et al. |
| 2008/0180457 A1 | 7/2008 | Yamazaki |
| 2009/0021566 A1 | 1/2009 | Usui et al. |
| 2009/0085942 A1 | 4/2009 | Asauchi |
| 2010/0007702 A1 | 1/2010 | Kosugi |

FOREIGN PATENT DOCUMENTS

| | | |
|---|---|---|
| EP | 1800872 A1 | 6/2007 |
| JP | H06-262771 A | 9/1994 |
| JP | H10-305590 A | 11/1998 |
| JP | 2001-146028 A | 5/2001 |
| JP | 2002-071456 A | 3/2002 |
| JP | 2005-043381 A | 2/2005 |
| JP | 2005-125738 A | 5/2005 |
| JP | 2006-082485 A | 3/2006 |
| JP | 2008-186095 A | 8/2008 |

OTHER PUBLICATIONS

International Searching Authority, International Search Report and Written Opinion for International Application No. PCT/JP2011/005541 (counterpart to above-captioned patent application), mailed Dec. 7, 2011.

European Patent Office, extended European Search Report for European Patent Application No. 11183579.9 (counterpart to above-captioned patent application), dated Jan. 18, 2012.

European Patent Office, extended European Search Report for European Patent Application No. 11183565.8 (counterpart to above-captioned patent application), dated Jan. 18, 2012.

Japan Patent Office, Office Action for Japanese Patent Application No. 2007-135295, mailed Aug. 9, 2011.

FIG.10B
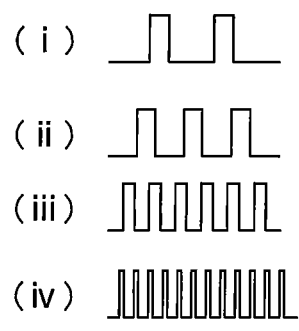
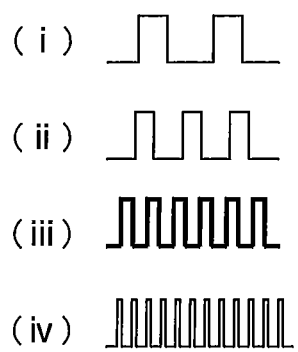

RECORDING APPARATUS CAPABLE OF DETECTING RESIDUAL AMOUNT OF INK IN INK CARTRIDGE

CROSS REFERENCE TO RELATED APPLICATION

This application claims priority from Japanese Patent Application No. 2010-222671 filed Sep. 30, 2010. The entire content of the priority application is incorporated herein by reference.

TECHNICAL FIELD

The present invention relates to an ink cartridge and a recording apparatus provided with a cartridge accommodating portion adapted to accommodate the ink cartridge therein.

BACKGROUND

A well-known inkjet-type recording apparatus is configured to form (record) an image on a recording medium by ejecting ink droplets thereon. Such recording apparatus is provided with a cartridge accommodating portion. An ink cartridge is insertable into and removable from the cartridge accommodating portion.

Generally, an ink cartridge stores therein ink of a particular color, such as black, cyan, magenta and yellow. That is, each ink cartridge carries particular information in terms of color. In case that a recording apparatus is provided with a plurality of ink cartridge accommodating portions, there may be chances that an ink cartridge for black is inadvertently mounted in the cartridge accommodating portion adapted to accommodate an ink cartridge for cyan.

There has been proposed a recording apparatus that can detect wrong installation of ink cartridges. This recording apparatus can determine types of mounted ink cartridges by reading individual identification stored in an IC chip attached to each ink cartridge. Another proposed recording apparatus can detect types of mounted ink cartridges by detecting values of resistor attached to each ink cartridge in order to detect wrong installation of the ink cartridges.

There has been proposed another type of recording apparatus provided with a detection unit using a photointerrupter for detecting a residual amount of ink in an ink cartridge. The ink cartridge used for this recording apparatus is provided with a prism or a sensor arm that enables an intensity of light incident on a photodiode to change depending on whether the ink is present at a prescribed position. The recording apparatus can determine whether the residual amount of ink is less than a prescribed amount by detecting a voltage outputted from the photointerrrupter.

SUMMARY

However, the provision of the prism or the sensor arm results in a complex mechanical construction in the above-identified the ink cartridge. Further, since the resistor or the IC chip needs to be attached to each ink cartridge, not only a complicated configuration becomes necessary for each cartridge, but also production costs of each ink cartridge would inevitably increase.

In view of the forgoing, it is an object of the present invention to provide a simple-structured recoding device capable of detecting whether an ink cartridge mounted in the recording apparatus is proper, as well as whether a residual amount of ink in the mounted ink cartridge is less than a prescribed amount.

In order to achieve the above and other objects, the present invention provides a recording apparatus including a cartridge accommodating section in which an ink cartridge of a predetermined type is mountable, and a controller. The ink cartridge includes: an ink chamber configured to store ink therein; a first heat conductor configured to conduct heat to the ink; a pyroelectric portion configured to output an electrical signal; and a first electrical interface connected to the pyroelectric portion. The cartridge accommodating section includes: a second electrical interface connectable to the first electrical interface when the ink cartridge is mounted in the cartridge accommodating section; a heater configured to apply heat; and a second heat conductor configured to conduct heat to the first heat conductor when the ink cartridge is mounted in the cartridge accommodating section. The controller is configured to determine at least one of the type of the ink cartridge mounted in the cartridge accommodating section and whether an amount of ink in the ink chamber is less than a predetermined amount based on the electrical signal inputted from the pyroelectric portion via the second electrical interface.

BRIEF DESCRIPTION OF THE DRAWINGS

In the drawings:

FIG. 10B is an explanatory view illustrating with what kind of frequencies pulses are outputted from each pyroelectric portion in accordance with its electrostatic capacitance during the detection process of FIG. 10A;

DETAILED DESCRIPTION

Figure 1:
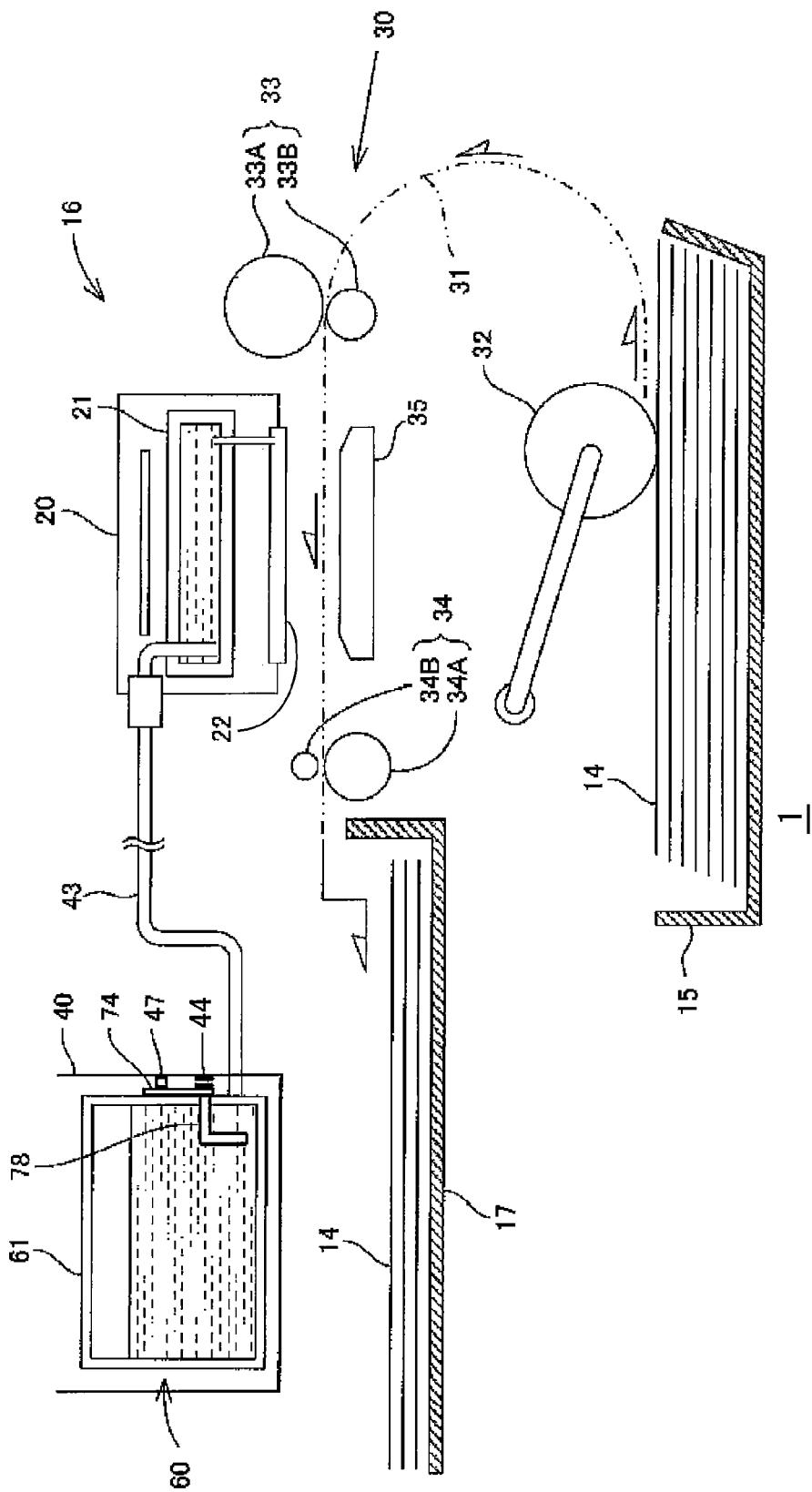
FIG. 1 is a schematic cross-sectional view of a recording apparatus according to an embodiment of the present invention, in which an ink cartridge according to the embodiment is accommodated in a cartridge accommodating section of the recording apparatus.

An ink cartridge 60 according to an embodiment of the present invention and a recording apparatus 1 in which the ink cartridge 60 is detachably mountable will be described with reference to FIGS. 1 through 5.

First, a general configuration of the recording apparatus 1 will be described with reference to FIGS. 1 and 5.

The recording apparatus 1 includes a casing (not shown) within which a printing unit 16, a sheet feed cassette 15 and a discharge tray 17 are provided. The sheet feed cassette 15 accommodates therein recording mediums 14 in a stacked state. The printing unit 16 functions to form an image on each recording medium 14 conveyed from the sheet feed cassette 15. The image-formed recording medium 14 is then discharged onto the discharge tray 17.

The recording apparatus 1 also includes a controller 81 (see FIG. 8) for controlling various operations of the recording apparatus 1. The controller 81 also serves to detect a type and a residual amount of ink of the mounted ink cartridge 60, as will be described later. The term "type" as used herein is intended to mean what kind of ink is contained in the ink cartridge 60, for example. Accordingly, a cyan ink cartridge 60 and a black ink cartridge 60 are treated as different types of ink cartridges in the present embodiment. Instead, ink cartridges 60 storing ink of the same color but made of different chromatic materials may be treated as different types of ink cartridges.

The printing unit 16 includes a conveying section 30, a recording head 20, a cartridge accommodating section 40 and a driving section (not shown).

The conveying section 30 is configured to convey the recording medium 14 accommodated in the sheet feed cassette 15. The conveying section 30 includes a sheet feed roller 32, a pair of conveyor rollers 33, a platen 35 and a pair of discharge rollers 34. The sheet feed roller 32 is configured to convey the recording medium 14 stacked in the sheet feed cassette 15 to a sheet conveying path 31. The pair of conveyor rollers 33 and the pair of discharge rollers 34 are configured to convey the recording medium 14 conveyed by the sheet feed roller 32. The platen 35 is positioned between the pair of conveyor rollers 33 and the pair of discharge rollers 34 in the sheet conveying path 31, as shown in FIG. 1.

The pair of conveyor rollers 33 is configured of a drive roller 33A and a follower roller 33B. The pair of discharge rollers 34 is configured of a drive discharge roller 34A and a follower discharge roller 34B. The drive roller 33A and the drive discharge roller 34A are driven by the driving section (not shown), and the follower roller 33B and the follower discharge roller 34B are configured to rotate following rotation of the drive roller 33A and the drive discharge roller 34A respectively. The recording medium 14 is conveyed over the platen 35 by at least one of the pairs of conveyor rollers 33 and the discharge rollers 34.

The recording head 20 is positioned above the platen 35. The recording head 20 includes a plurality of sub-tanks 21, a plurality of nozzles 22 and a plurality of piezoelectric elements 23 (see FIG. 5).

Each sub-tank 21 serves to temporarily store ink supplied from each ink cartridge 60. The ink stored in each sub-tank 21 is then supplied to the plurality of nozzles 22.

Each nozzle 22 has an ink discharge outlet (not shown) facing toward the platen 35 positioned below. In response to print data, the piezoelectric elements 23 are selectively deformed such that the corresponding nozzles 22 can eject ink therefrom toward the recording medium 14 conveyed over the platen 35. In the present embodiment, the controller 81 controls whether to activate the piezoelectric elements 23 for ejecting the ink from the nozzles 22. The controller 81 may alternatively employ a heater to generate heat for producing bubbles in the ink such that the ink is ejected from the nozzles 22.

The recording head 20 is supported to a carriage (not shown). This carriage is configured to move in a direction perpendicular to a conveying direction of the recording medium 14 (left-to-right direction in FIG. 1) as well as to a height direction of the recording apparatus 1 (vertical direction in FIG. 1), that is, in a direction perpendicular to the sheet of FIG. 1. The carriage is driven by the driving section (not shown). An image can be recorded on an entire surface of the recording medium 14 due to the movement of the recording head 20 against the recording medium 14 conveyed to the platen 35 by the conveying section 30.

The driving section (not shown) includes a plurality of motors 19 (FIG. 8) and a driving force transmission mechanism (not shown) for transmitting a driving force of the motors 19 to the conveying section 30 and so on. The motors 19 are driven by a motor drive circuit 85 (also see FIG. 8) that is controlled by the controller 81.

The controller 81 is configured to control movements of the recording head 20 and the carriage. The controller 81 controls the recording medium 14 to intermittently move over the platen 35. While the recording medium 14 is stopped moving on the platen 35, the controller 81 controls the recording head 20 to eject ink droplets onto the stationary recording medium 14 to record an image on the recording medium 14. The controller 81 controls the motors 19 to rotate the pair of discharge rollers 34 in order to discharge the image-recorded recording medium 14 onto the discharge tray 17.

As shown in FIG. 1, the cartridge accommodating section 40 has a parallelepiped box-shaped casing. The casing has one open surface through which the ink cartridges 60 can be inserted. A cover (not shown) is movably provided at the cartridge accommodating section 40 for opening and closing the open surface. The casing has an internal space that is divided into smaller spaces partitioned by a plurality of partitioning walls. The cartridge accommodating section 40 accommodates therein the ink cartridges 60 each storing ink of one of the colors among cyan, magenta, yellow and black.

As shown in FIG. 1, the cartridge accommodating section 40 includes an ink tube 43 for supplying ink stored in each ink cartridge 60 to the recording head 20 and a pair of first electrical interfaces 44 for achieving electrical connection between each ink cartridge 60 and the cartridge accommodating section 40.

Figure 5:
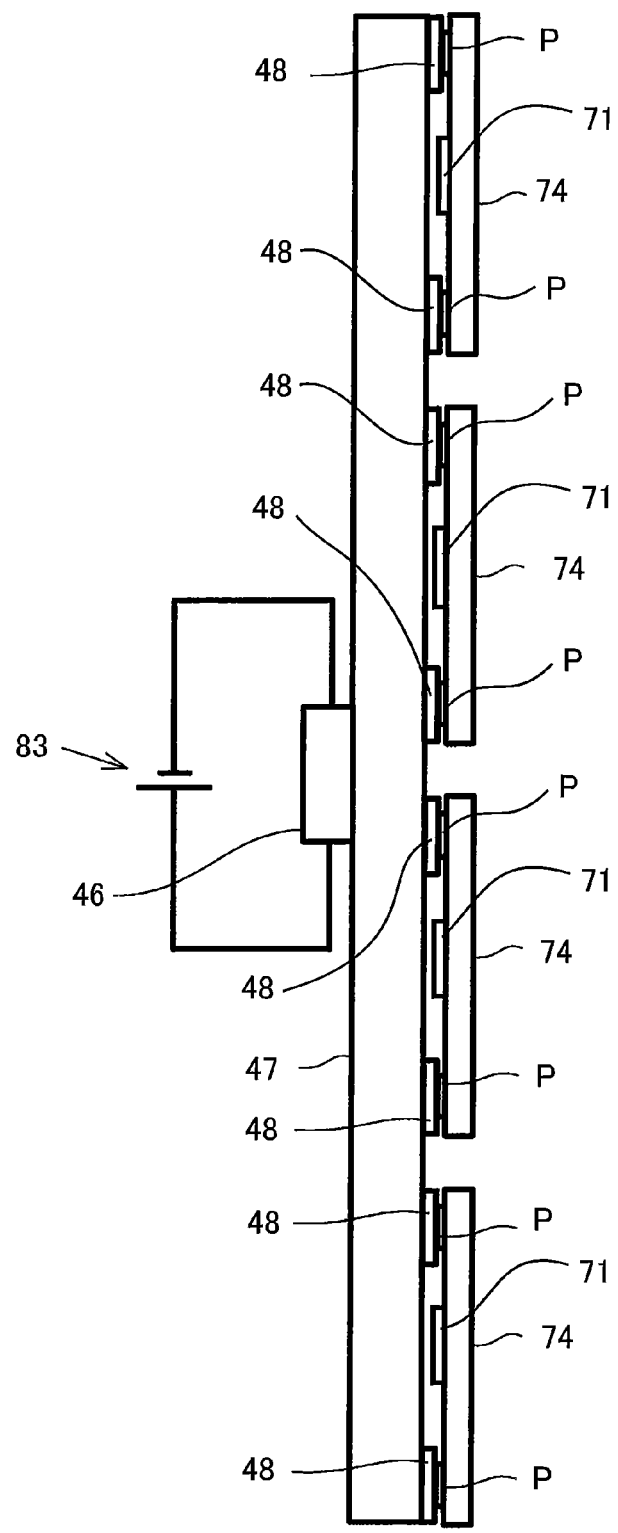
FIG. 5 is a schematic view illustrating how a thermal conductor provided on the cartridge accommodating section is brought into contact with each sensor board when the ink cartridges according to the embodiment are mounted in the recording apparatus.

Referring to FIG. 5, the cartridge accommodating section 40 further includes a resistor 46 for applying heat and a thermal conductor 47 for conducting the heat applied from the resistor 46 to a sensor board 74 of ink cartridge 60, as will be described later. The thermal conductor 47 is made of a metal plate and is disposed to be in contact with the resistor 46. A plurality of insulating members 48 (electrically insulative) is disposed on the thermal conductor 47 such that each insulating member 48 is brought into contact with each circuit pattern P (described later) provided on the sensor board 74 of the ink cartridge 60.

In other words, the thermal conductor 47 functions to conduct heat applied from the resistor 46 to the sensor board 74, and the insulating member 48 functions to block electrical contact between the circuit patterns P on the sensor board 74. Alternatively, the thermally conductive member 47 itself may be formed of an electrically insulative material.

Next, a detailed configuration of the ink cartridge 60 according to the embodiment will be described with reference to FIGS. 2 through 4.

The ink cartridge 60 includes a cartridge casing 61 defining therein an ink chamber (not shown) for storing ink, and a sensor chip 70 whose outputs are used for detecting the color (type) and the residual amount of ink in the ink cartridge 60.

Figure 2:
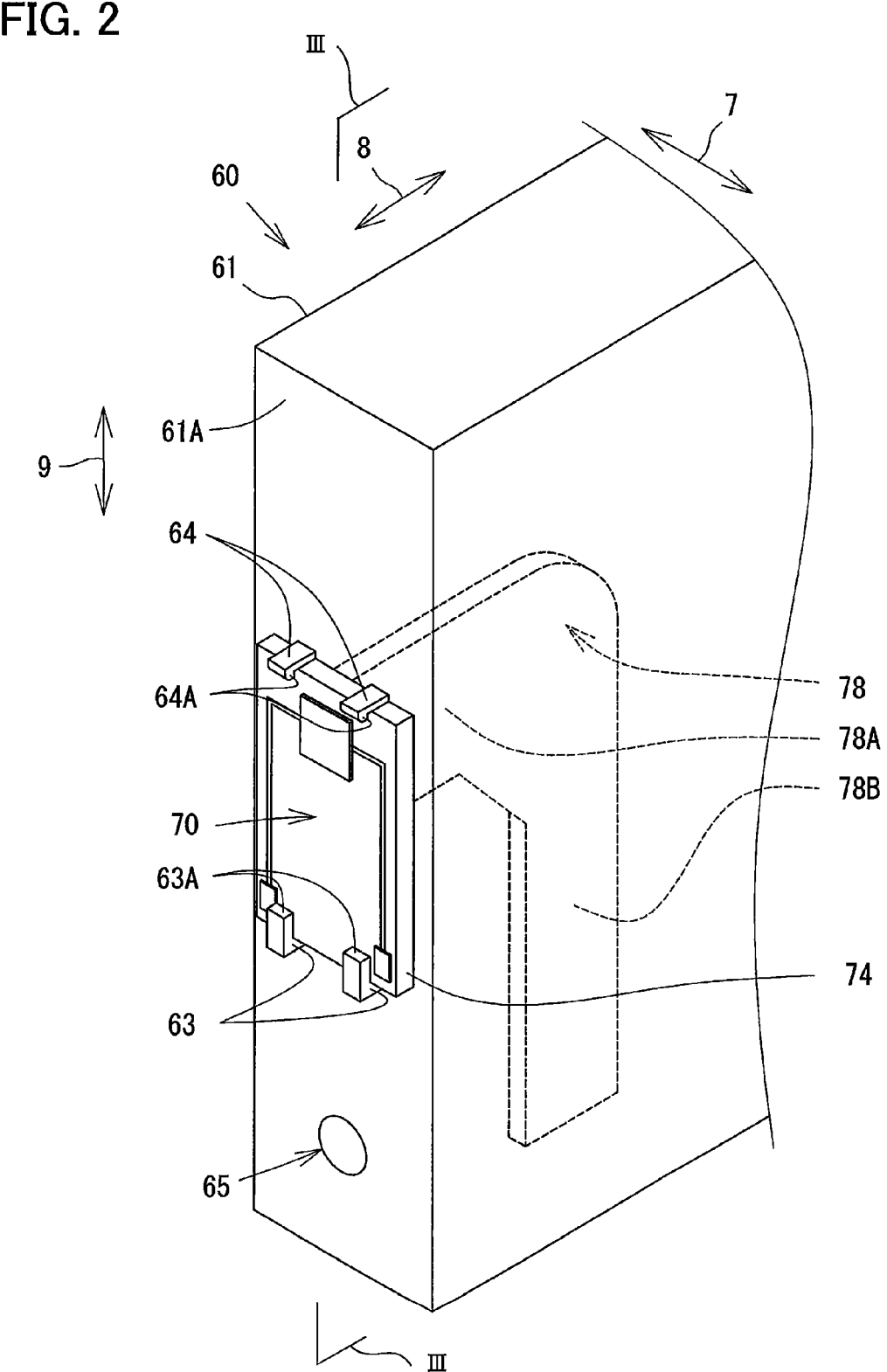
FIG. 2 is a schematic perspective view of the ink cartridge according to the embodiment, the ink cartridge including a sensor chip according to the embodiment.

As shown in FIG. 2, the cartridge casing 61 has a flat rectangular parallelepiped shape whose thickness is shorter than its depth and height. The cartridge casing 61 is formed, for example, by attaching a film to a frame. When mounted in the cartridge accommodating section 40, the ink cartridge 60 is held in a mounting position shown in FIG. 2.

Hereinafter, terms "upward", "downward", "upper", "lower", "above", "below", "beneath" and the like will be used throughout the description assuming that the ink cartridge 60 is in the mounting position. The cartridge casing 61 has a thickness in a widthwise direction 7, a depth in a depth direction 8 and a height in a height direction 9 perpendicular to the widthwise direction 7 and the depth in a depth direction 8. In the embodiment, in the mounting position, the widthwise direction 7 corresponds to a horizontal direction, and the height direction 9 is coincident with a vertical direction of the recording apparatus 1.

The cartridge casing 61 has a surface 61A on which an ink outlet port 65 is formed. In the mounting position, the ink outlet port 65 is connected to the ink tube 43 such that the ink accommodated in the cartridge casing 61 flows into the sub-tank 21 of the same color via the ink tube 43. On the surface 61A, the sensor board 74 of the sensor chip 70 (described next) is fixed. Hereinafter, the surface 61A of the cartridge casing 61 will be referred to as an attachment surface 61A.

On the attachment surface 61A, a pair of positioning claws 63 and a pair of engaging claws 64 are provided for holding the sensor board 74, as shown in FIG. 2. The positioning claws 63 are disposed in separation from each other in the widthwise direction 7. The pair of engaging claws 64 is disposed such that the engaging claws 64 are in separation from each other in the widthwise direction 7 and spaced away from the positioning claws 63 in the height direction 9. Each positioning claw 63 has a base portion and a claw portion 63A protruding from the base portion toward the opposing engaging claw 64. Likewise, each engaging claw 64 has a base portion and a claw portion 64A protruding from the base portion toward the opposing positioning claw 63. The engaging claw 64 is made of a synthetic resin and has a resiliency. For fixing the sensor board 74 on the attachment surface 61A, the engaging claws 64 resiliently deform such that the sensor board 74 can be fitted in a space formed between the positioning claws 63 and the engaging claws 64. The sensor board 74 may be welded to the attachment surface 61A or may be attached to the attachment surface 61A by an adhesive agent.

Figure 3:
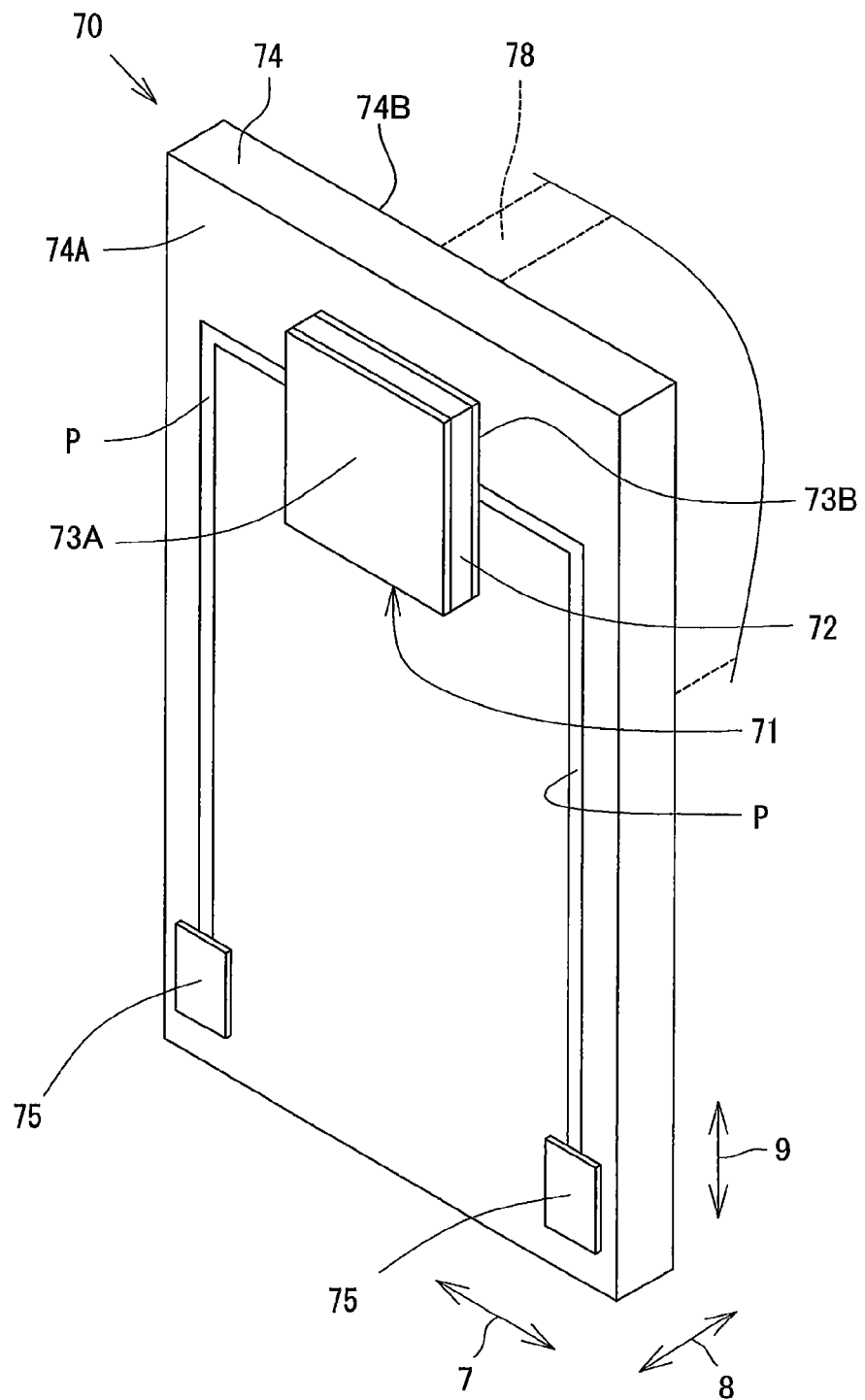
FIG. 3 is a schematic perspective view of the sensor chip according to the embodiment, the sensor chip including a pyroelectric portion and a sensor board.

The sensor chip 70 includes the sensor board 74 and a heat conductor 78, as shown in FIGS. 2 and 3.

Specifically, the sensor board 74 includes a pyroelectric portion 71, a pair of second electrical interfaces 75 and a pair of circuit patterns P.

The sensor board 74 is made of an electrically insulative material such as glass epoxy and ceramics. The sensor board 74 is formed in a rectangular plate shape, having a pair of flat surfaces 74A, 74B opposing to each other in the depth direction 8. Hereinafter, as shown in FIG. 3, one of the flat surface 74B in direct confrontation with the attachment surface 61A is referred to as a contact surface 74B, whereas another flat surface 74A on which the pyroelectric portion 71 is disposed is referred to as a mounting surface 74A. The sensor board 74 is held to the cartridge casing 61 by being engaged between the pairs of positioning claws 63 and the engaging claws 64.

The pyroelectric portion 71 is disposed on the mounting surface 74A of the sensor board 74. As shown in FIGS. 2 through 4, the pyroelectric portion 71 has a three-layered structure, including a film-like pyroelectric element 72 (dielectric material) and a pair of film electrodes 73A, 73B interposing the pyroelectric element 72 therebetween in the depth direction 8. In FIGS. 2 through 4, the pyroelectric element 72 is shown to have a certain thickness, but in fact the pyroelectric element 72 has a thin film-like shape. The pyroelectric portion 71 has a prescribed electrostatic capacitance. The pyroelectric portion 71 is held to the sensor board 74 (the mounting surface 74A) by an insulating thin film, for example, an organic insulation film such as polyimide resin film, or an inorganic insulation film such as $SiO_2$ thin film and $Si_3N_4$ thin film.

The pyroelectric element 72 is formed in a rectangular film-like shape and is made of lead zirconium titanate, for example. The pyroelectric element 72 exhibits the pyroelectric effect according to which a change in temperature causes intrinsic polarization. As the pyroelectric element 72, the following pyroelectric materials are available other than lead zirconium titanate: inorganic materials such as lithium titanate, other lead titanate, tourmaline (cyclo-silicate mineral including boron) and lithium tantalate, or organic materials such as triglycine sulfate (TGS) and polyvinylidene fluoride (PVDF).

Each of the film electrodes 73A, 73B is formed in a rectangular film-like shape, and is vapor-deposited (evaporated) to the pyroelectric element 72. The film electrode 73A, which constitutes a top surface of the pyroelectric portion 71, is made of a NiCr (Nichrome) thin-film whose infrared reflectance is low in order to realize enhanced efficiency in absorption of infrared rays transmitted to the pyroelectric element 72. The film electrode 73B, which is in contact with the mounting surface 74A of the sensor board 74 via the insulating thin film (not shown), is made of a Pt (platinum) thin film.

The pyroelectric portion 71 is disposed on the mounting surface 74A at a position closer to the pair of engaging claws 64 than to the pair of positioning claws 63 in the height direction 9 (i.e., at an upper portion of the mounting surface 74A in FIG. 2). Each film electrode 73A, 73B of the pyroelectric portion 71 is connected to either one of the circuit patterns P provided on the sensor board 74 by means of wire bonding, for example.

The film electrodes 73A, 73B are not necessarily vapor-deposited (evaporated) to the pyroelectric element 72. Instead, each of the film electrodes 73A, 73B may be integrally formed with each circuit pattern P and attached to the pyroelectric element 72 by an electrically-conductive adhesive agent or by means of wire bonding.

Figure 6:
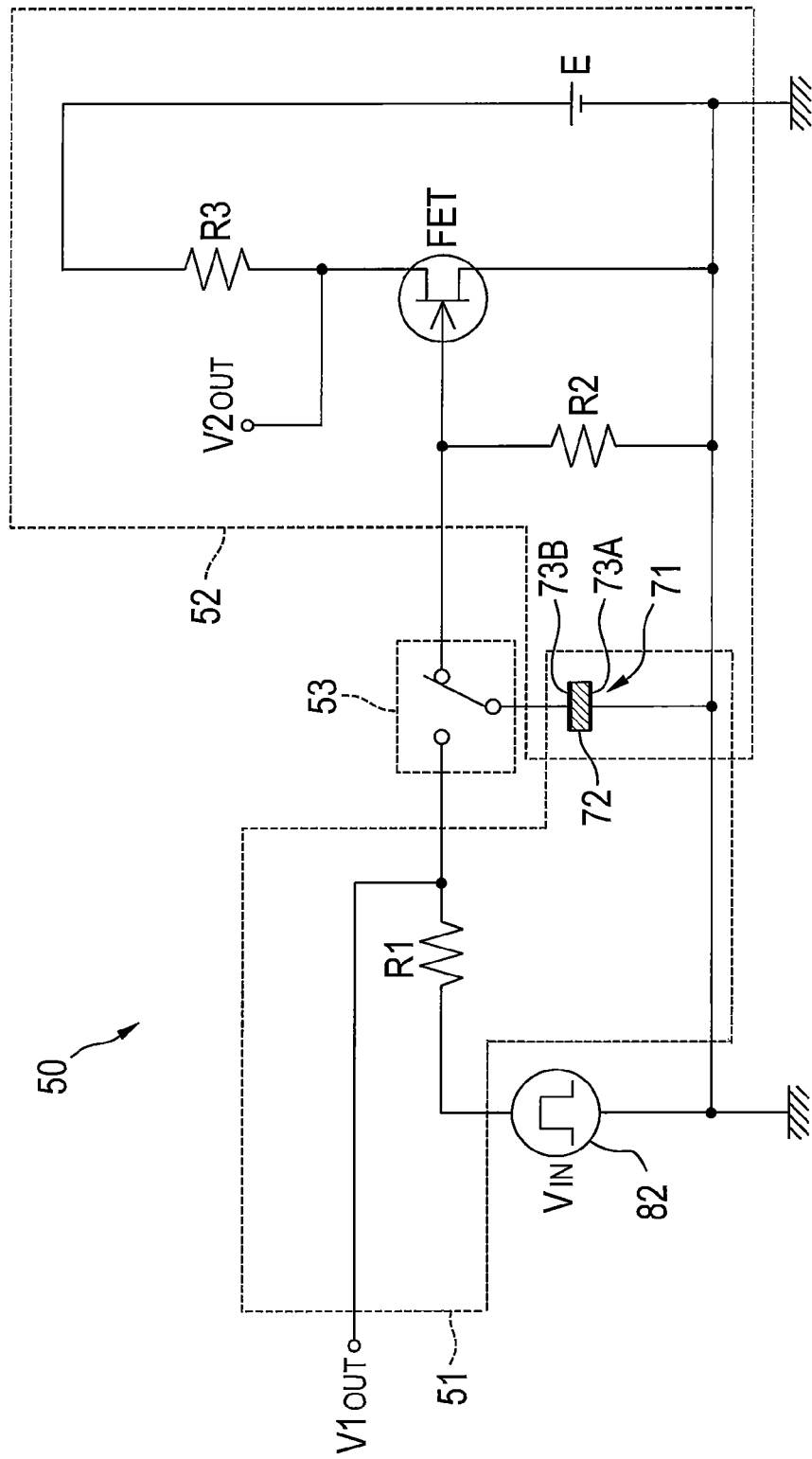
FIG. 6 is an electric circuit diagram of a detection scheme configured when the ink cartridge of the embodiment is mounted in the recording apparatus according to the embodiment, wherein the electric circuit is configured of a first detection circuit (RC circuit) and a second detection circuit.
Figure 7:
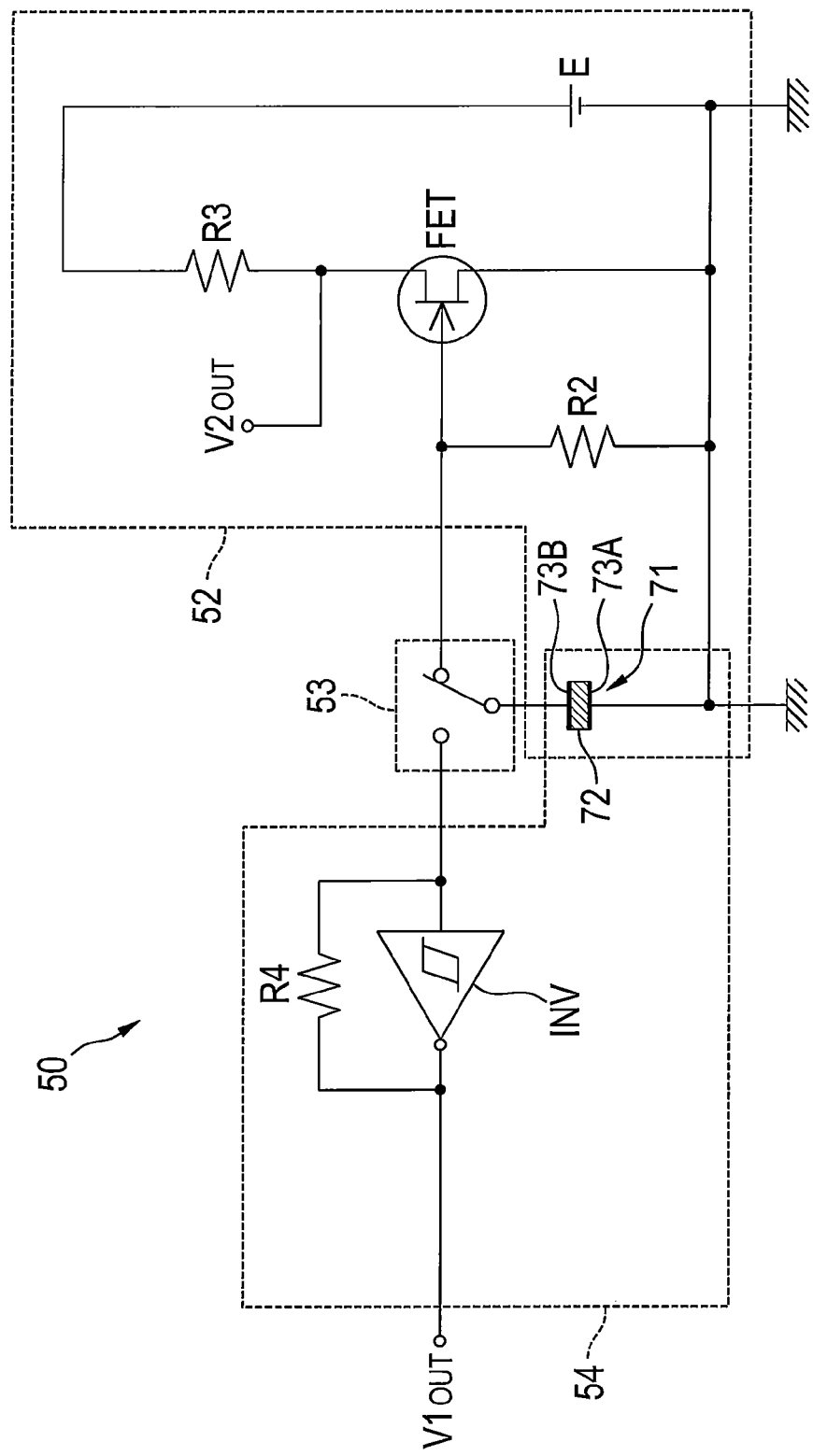
FIG. 7 is another electric circuit diagram of a detection scheme configured when the ink cartridge of the embodiment is mounted in the recording apparatus according to the embodiment, wherein the electrical circuit is configured of another first detection circuit (oscillation circuit) and the second detection circuit.

The film electrode 73A is virtually grounded, as shown in FIGS. 6 and 7. Each circuit pattern P is arranged on the mounting surface 74A of the sensor board 74 such that, when the ink cartridge 60 is mounted in the cartridge accommodating section 40, each circuit pattern P is brought into contact with each insulating member 48 on the thermal conductor 47 provided at the cartridge accommodating section 40, as shown in FIG. 5.

The electrostatic capacitance of the pyroelectric portion 71 can vary depending on an electric permittivity of the pyroelectric element 72, a distance between the film electrodes 73A, 73B (a thickness of the pyroelectric element 72) and an area of the film electrodes 73A, 73B. In other words, the electrostatic capacitance of the pyroelectric portion 71 can be changed by changing the material constituting the pyroelectric portion 71, or, instead of changing the material, by changing the thickness of the pyroelectric element 72 or the area of the film electrodes 73A, 73B. In the present embodiment, each ink cartridge 60 is designed to have the pyroelectric portion 71 whose electrostatic capacitance is different from one another, depending on colors of ink or types of chromatic materials of ink stored in the ink cartridges 60. That is, the electrostatic capacitance of each pyroelectric portion 71 can be set to a particular value that is unique (peculiar) to each ink cartridge 60.

The pair of second electrical interfaces 75 is disposed on the mounting surface 74A each at a position closer to the positioning claws 63 than to the engaging claws 64 in the height direction 9 (at a lower portion of the mounting surface 74A) but offset from each positioning claw 63 in the widthwise direction 7. In other words, the second electrical interfaces 75 are exposed on the attachment surface 61A of the cartridge casing 61 at which the ink outlet port 65 is formed. When the ink cartridge 60 is mounted in the cartridge accommodating section 40, the second electrical interfaces 75 are respectively brought into abutment with the first electrical interfaces 44 provided on the cartridge accommodating section 40. Each second electrical interface 75 is connected to either one of the film electrodes 73A, 73B via the corresponding circuit pattern P.

The heat conductor 78 is a thin-plate (or a film-like) shaped member for forming a heat conduction path between the sensor board 74 and the ink stored in the ink chamber. As shown in FIG. 2, the heat conductor 78 includes a penetrating portion 78A (as a base portion) and a protruding portion 78B protruding downward from the penetrating portion 78A.

The penetrating portion 78A penetrates through the attachment surface 61A of the cartridge casing 61 (see FIG. 4) and has a tip end portion from which the protruding portion 78B protrudes downward as shown in FIG. 2.

Figure 4:
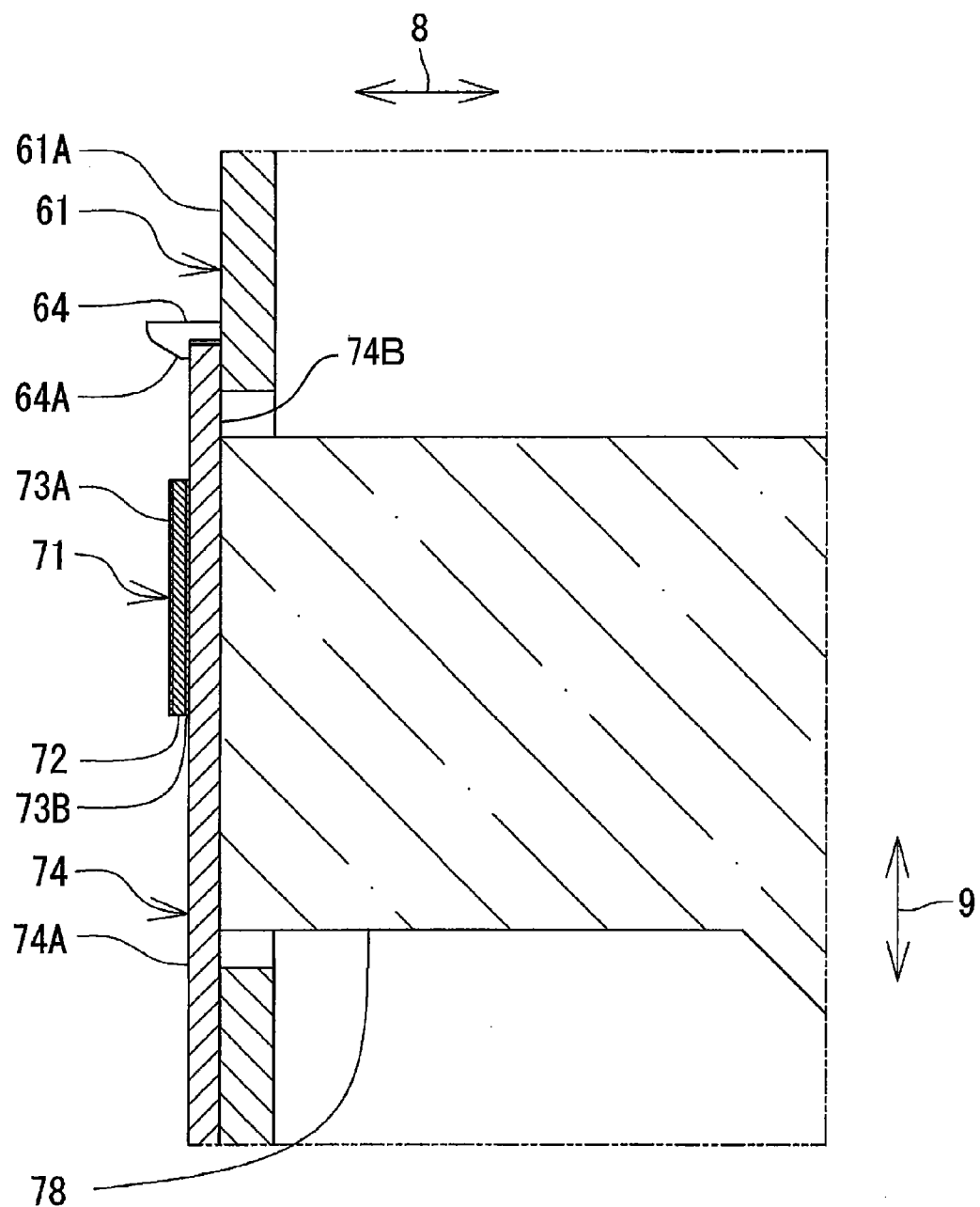
FIG. 4 is a partially-enlarged vertical cross-sectional view of the ink cartridge according to the embodiment taken along a plane in FIG. 2.

More specifically, as show in FIG. 4, the penetrating portion 78A is provided to be in direct contact with the sensor board 74. Alternatively, the penetrating portion 78A may be disposed to be adjacent to the sensor board 74. The protruding portion 78B has a bottom end that is positioned at a lower portion of the cartridge casing 61 in the mounting position. The heat conductor 78 is fabricated by a material having a relatively high thermal conductivity, such as copper foil and aluminum foil. As such, since formed as a thin-plate made of a material having a high thermal conductivity, the heat conductor 78 is allowed to have an improved thermal conductivity.

The heat conductor 78 serves to conduct heat, which is conducted to the sensor board 74 from the resistor 46 via the thermal conductor 47, to the ink stored in the ink chamber defined in the cartridge casing 61.

More precisely, the heat applied from the resistor 46 is conducted from the thermal conductor 47 to both of the heat conductor 78 and the pyroelectric portion 71 via the insulating members 48 and the circuit patterns P. When there is a sufficient amount of ink remaining in the ink chamber, the heat conducted to the heat conductor 78 is conducted to the ink since the heat conductor 78 is generally soaked in the ink. At the same time, the pyroelectric portion 71 is also applied with heat, but is cooled down by the ink stored in the ink chamber since the sufficient amount of ink can absorb the heat conducted to the pyroelectric portion 71 in addition to the heat directly conducted from the heat conductor 78. The pyroelectric portion 71 therefore exhibits little change in temperature.

In other words, when the amount of ink is sufficient, the heat applied from the resistor 46 can be ultimately released to the ink, thereby suppressing heat from being conducted to the pyroelectric portion 71. The amount of heat conducted to the pyroelectric portion 71 when a current flows into the resistor 46 is smaller than that conducted to the ink, since the amount of heat conducted to the ink is a combination of the amount of heat conducted directly from the heat conductor 78 and the amount of heat conducted from the pyroelectric portion 71 via the sensor board 74. Since little amount of heat is applied, the pyroelectric portion 71 has preserved little amount of heat to develop a voltage between the film electrodes 73A, 73B.

However, when the amount of ink in the ink chamber becomes smaller, the heat conductor 78 gradually starts to be exposed from the ink. When the ink further decreases and the bottom end of the heat conductor 78 is completely exposed from the ink, heat can no longer be conducted to the ink from the heat conductor 78. As a result, the heat conducted to the heat conductor 78, which had been conducted to the ink while the heat conductor 78 was in contact with the ink, is now conducted to the pyroelectric portion 71 via the sensor board 74. Likewise, the heat conducted to the pyroelectric portion 71 can no longer be conducted to the ink, either. Therefore, the temperature of the pyroelectric portion 71 starts to rise due to the heat conducted from the resistor 46 and the heat conducted from the heat conductor 78 via the sensor board 74.

In other words, the greater amount of heat is now conducted to the pyroelectric portion 71 than to the heat conductor 78 exposed from the ink, causing the temperature of the pyroelectric portion 71 to increase significantly. As a result, due to the pyroelectric effect, a voltage is developed between the pair of film electrodes 73A, 73B. The voltage is then outputted to the controller 81 for detecting the residual amount of ink in the ink cartridge 60.

In this way, since the protruding portion 78B extends in the height direction 9 to have its bottom end positioned at the lower portion of the cartridge casing 61 in the mounting position, the recording apparatus 1 can detect that the amount of ink left in the cartridge casing 61 falls below a prescribed amount by detecting the output voltage from the pyroelectric portion 71.

Next, an electrical connection between the mounted ink cartridge 60 and the recording apparatus 1 (serving as a detection scheme 50) according to the embodiment will be described with reference to FIGS. 6 and 7.

The detection scheme 50 is configured of a first detection circuit 51, a second detection circuit 52 and a toggle switch 53. The first detection circuit 51 is provided for detecting the electrostatic capacitance of the pyroelectric portion 71 to thereby identify the type (color) of the ink cartridge. It should be noted that the pyroelectric portion 71 is electrically equivalent to a capacitor. In the description of the circuits shown in FIGS. 6 and 7, the pyroelectric portion 71 may be referred to as a capacitor 71 where necessary. The second detection circuit 52 is provided for detecting the voltage developed across the capacitor 71 to thereby indicate the residual amount ink in the ink cartridge 60. The toggle switch 53 is illustrated to include a first-detection side fixed contact, a second-detection side fixed contact, and a wiper contact that can trip between the two fixed contacts. The first detection circuit 51 or the second detection circuit 52, whichever is selected by the switch 53, is connected to the pyroelectric portion 71. The switch 53 is operated in accordance with signals from the controller 81. An electromagnetic switch or a semiconductor switch is available as the switch 53.

The first detection circuit 51 is closed when the wiper contact of the switch 53 is toggled to the first-detection side contact. The first detection circuit 51 is configured of the capacitor 71, and a resistor R1 having one terminal connected to the non-grounded side electrode 73B of the capacitor 71 and another terminal connected to a first drive circuit 82. As will be described later with reference to FIG. 8, the first drive circuit 82 is a part of a control circuit 80 and outputs, under the aegis of the controller 81, a pulse signal having a voltage level $V_{IN}$ with a predetermined duration. A totem-pole output circuit well known in the art can be used for the first drive circuit 82. An output from the first detection circuit 51 is derived from an output terminal $V1_{out}$ connected to a node between the resistor R1 and the none-grounded side electrode 73B of the capacitor 71.

The first detection circuit 51 forms an RC circuit in which the capacitor 71 is gradually charged in response to the pulse signal applied from the first drive circuit 82. The voltage developed across the capacitor 71 is detected at a relevant time t1 before the capacitor is fully charged and the resultant voltage is outputted to an A/D converter 89 (described later) of the controller 81 through the output terminal $V1_{OUT}$. In the transition period before the capacitor 71 is fully charged, the voltage across the capacitor 71 differs depending upon the electrostatic capacitance. The voltage across the capacitor 71 and the electrostatic capacitance thereof are in an exponential curve relation. More specifically, the smaller the electrostatic capacitance is, the higher the voltage is developed across the capacitor. Among capacitors different in electrostatic capacitance, the capacitor with the smallest electrostatic capacitance C1 develops the highest voltage thereacross and the capacitor with the second smallest electrostatic capacitance C2 develops the second highest voltage thereacross at time t1 as shown in FIG. 9B. The difference $\Delta V$ between the highest and the second highest voltages enables the two types of capacitors different in electrostatic capacitance to distinguish. The above-described voltage-and-capacitance relation is true with respect to the remaining two capacitors having electrostatic capacitances C3 and C4 shown in FIG. 9B. Thus, the type (color) of the ink cartridge 60 can be identified by the voltage detected at time t1.

The second detection circuit 52 is closed when the wiper contact of the switch 53 is toggled to the second-detection side contact. The second detection circuit 52 is configured of a DC power source E, resistors R2, R3, and a field-effect transistor (FET). The second detection circuit 52 serves as an amplifier circuit. More specifically, the FET has a gate to which a voltage developed across the resistor R2 is applied, a drain connected to one terminal of the resistor R3, and a source connected to the negative terminal of the DC power source E. The resistor R3 is connected between the positive terminal of the DC power source E and the drain of the FET. The output terminal $V2_{OUT}$ is derived from a node connecting the resistor R3 and the drain of the FET. In operation, when a voltage is applied to the gate of the FET, the latter is rendered conductive and its ON resistance changes depending upon the gate voltage. The voltage derived from the output terminal $V2_{OUT}$ is amplified with respect to the gate voltage equal to the voltage developed across the capacitor 71. In this way, the output voltage generated at the pyroelectric portion 71 due to heat conducted from the resistor 46 is amplified by the amplifier circuit and then outputted to the controller 81 for detection of the residual amount ink in the ink cartridge 60.

FIG. 7 shows another example of the first detection circuit. In this example, an oscillation circuit is used in the first detection circuit and is referred to either as a first detection circuit 54 or an oscillation circuit 54. The configuration of the second detection circuit 52 is the same as that shown in FIG. 6. The first detection circuit (oscillation circuit) 54 shown in FIG. 7 includes the capacitor 71, a resistor R4 and an inverter (INV). The resistor R4 and inverter are connected in parallel and this parallel-connection circuit is connected to the non-grounded side electrode 73B of the capacitor 71. The output of the inverter is used as the output $V1_{OUT}$ of the first detection circuit 54. The first detection circuit (oscillation circuit) 54 generates pulse trains having a frequency determined depending upon the electrostatic capacitance of the capacitor 71. Therefore, the frequency of the pulse trains can identifies the color or type of the cartridge 60.

The inverter has two threshold values $V_{T+}$ and $V_{T-}$ where $V_{T+}$ is greater than $V_{T-}$. Before turning on a power source (not shown) of the oscillation circuit 54, no electric charges are accumulated in the capacitor 71, so that the voltage across the capacitor 71 is zero. In this case, the input to the inverter is treated as being at a low level and thus the output of the inverter is at a high level. When the capacitor 71 is gradually charged and the voltage across the capacitor 71 has reached the upper threshold value $V_{T+}$, then the input to the inverter is treated as being changed from the low level to the high level, causing the output of the inverter to change from the high level to a low level. The electric charges accumulated in the capacitor 71 are then discharged through the resistor R4 and the voltage across the capacitor 71 is gradually lowered. When the voltage across the capacitor 71 has lowered to the lower threshold value $V_{T-}$, the input to the inverter is treated as being changed from the high level to the low level, causing the inverter output to change from the low level to the high level. In this way, pulse trains are outputted from the output terminal $V1_{OUT}$ of the oscillation circuit 54 to the A/D converter 89. The frequency of the pulse trains outputted therefrom changes depending upon the electrostatic capacitance of the capacitor 71. Accordingly, the ink cartridges having their own electrostatic capacitance can be identified from the frequency of the oscillated pulse trains.

Figure 8:
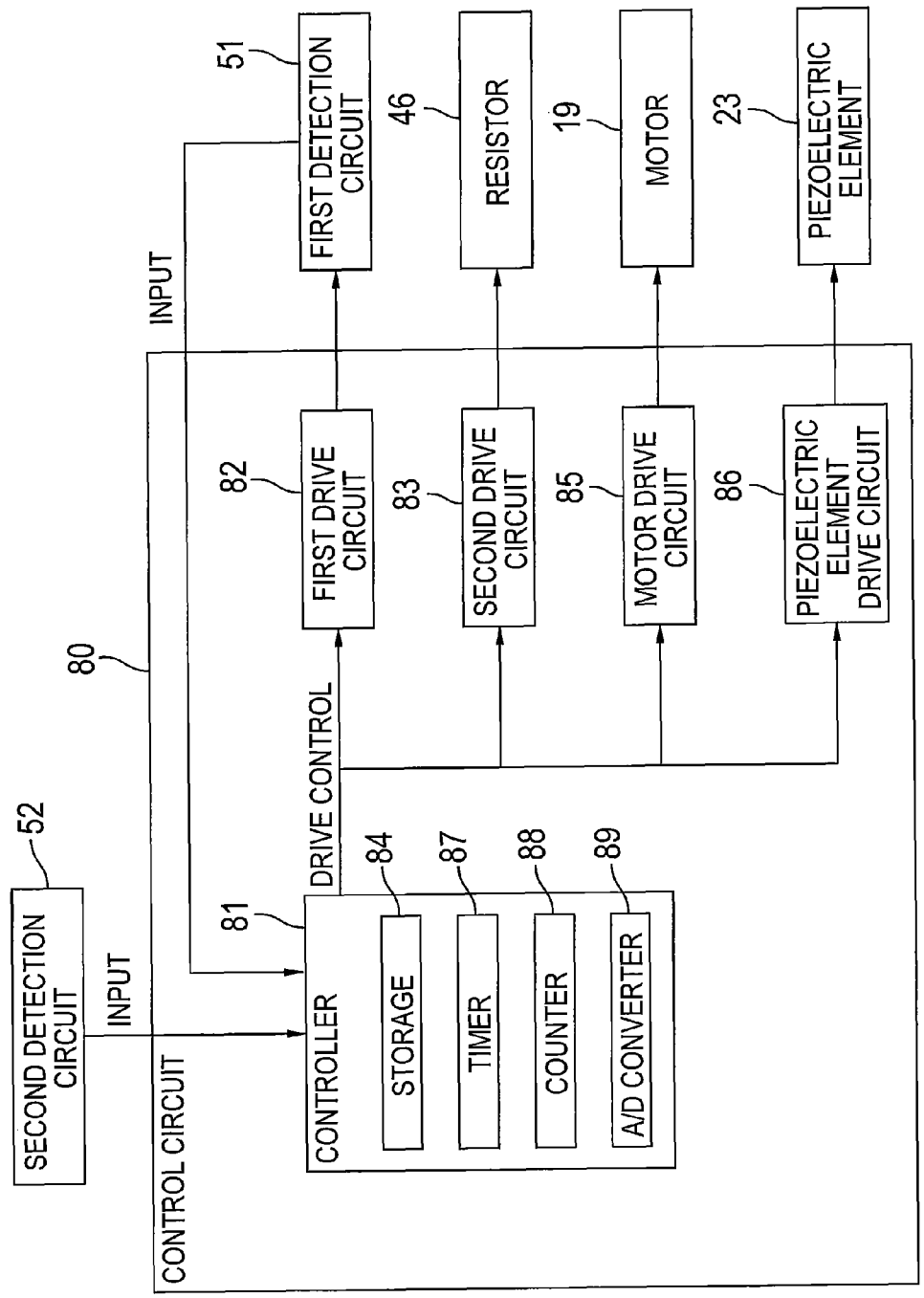
FIG. 8 is a block diagram showing an internal control system of the recording apparatus according to the embodiment.

Next, an internal control system of the recording apparatus 1 will be described with reference to FIG. 8.

The recording apparatus 1 includes the control circuit 80 which controls power supply to the first detection circuit 51, the resistor 46, the motors 19 and the piezoelectric elements 23.

The control circuit 80 includes the controller 81, the motor drive circuit 85 for driving the motors 19, a piezoelectric element drive circuit 86 for driving the piezoelectric elements 23, the first drive circuit 82 for driving the first detection circuit 51, and a second drive circuit 83 for supplying power to the resistor 46. The controller 81 controls whether to drive the first drive circuit 82, the second drive circuit 83, the motor drive circuit 85 and the piezoelectric element drive circuit 86.

The controller 81 includes a storage 84, a timer 87, a counter 88 and the A/D converter 89. The storage 84 stores therein a first determination table and a second determination table. The first determination table contains predetermined values (to be referred to as first values) for determining types of the ink cartridges 60 mounted in the cartridge accommodating section 40. The second determination table contains a prescribed value (to be referred to as a second value) as a threshold value for determining the residual amount of ink in each ink cartridge 60. The A/D converter 89 serves to convert analog signals outputted from the first detection circuit 51 into digital signals. The timer 87 and the counter 88 will be necessary when the recording apparatus 1 performs detection of the type of the ink cartridge 60 mounted therein and detection of the residual amount of ink in the ink cartridge 60, as will be described next.

How the recording apparatus 1 will determine the type (color) of the ink cartridge 60 mounted therein will first be described. In the present embodiment, the detection of the electrostatic capacitance of the pyroelectric portion 71 is performed using the first detection circuit 51 shown in FIG. 6. However, as described earlier, the electrostatic capacitance of the pyroelectric portion 71 can also be detected by using the oscillation circuit 54 shown in FIG. 7. Hereinafter, therefore, a process for detecting the electrostatic capacitance of the pyroelectric portion 71 using the first detection circuit 51 of FIG. 6 will first be described with reference to FIGS. 9A and 9B. Then, another process for detecting the electrostatic capacitance of the pyroelectric portion 71 using the first detection circuit (oscillation circuit) 54 of FIG. 7 will be described with reference to FIGS. 10A and 10B.

Figure 9A:
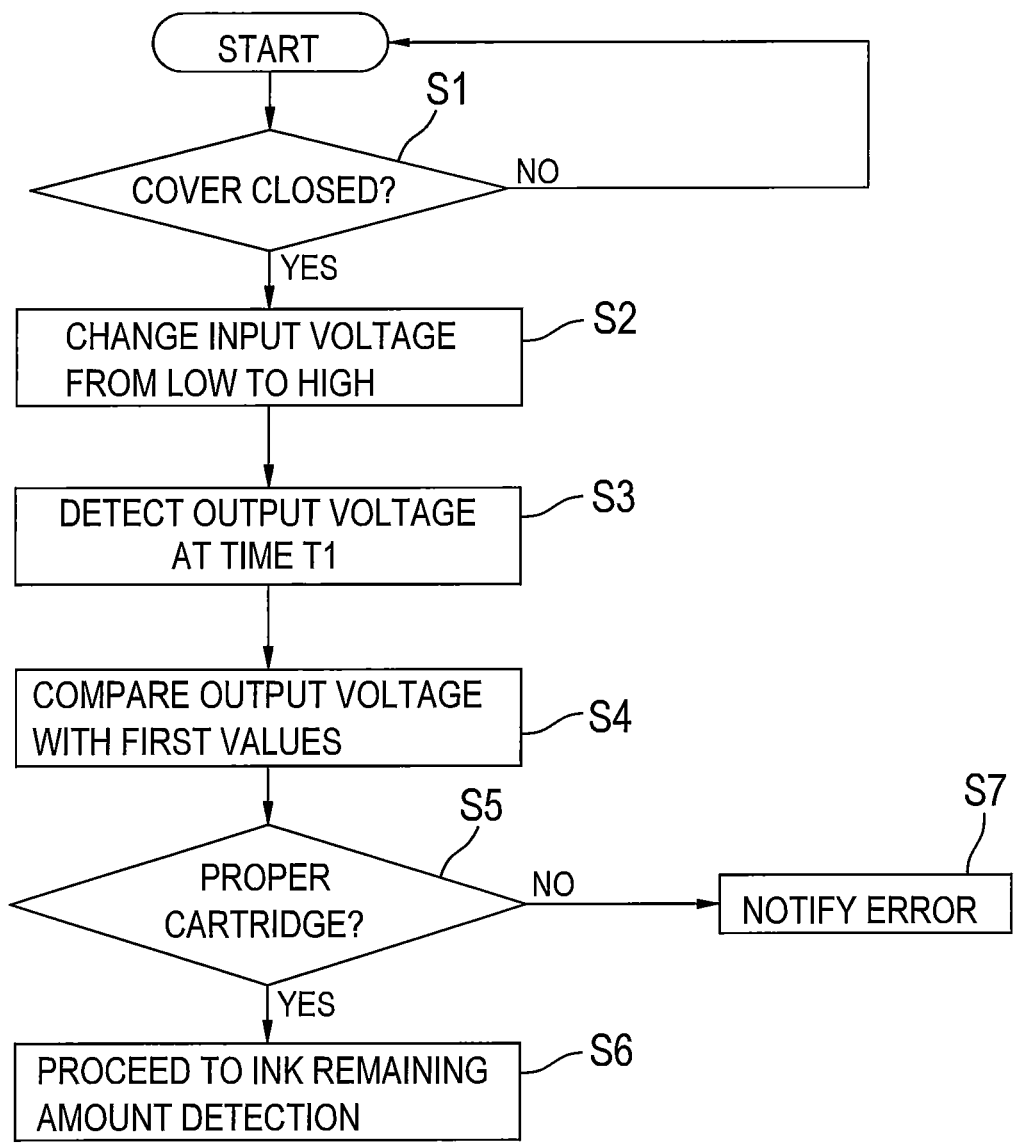
FIG. 9A is a flowchart of a process executed for detecting the electrostatic capacitance of the pyroelectric portion using the first detection circuit of FIG. 6.
Figure 9B:
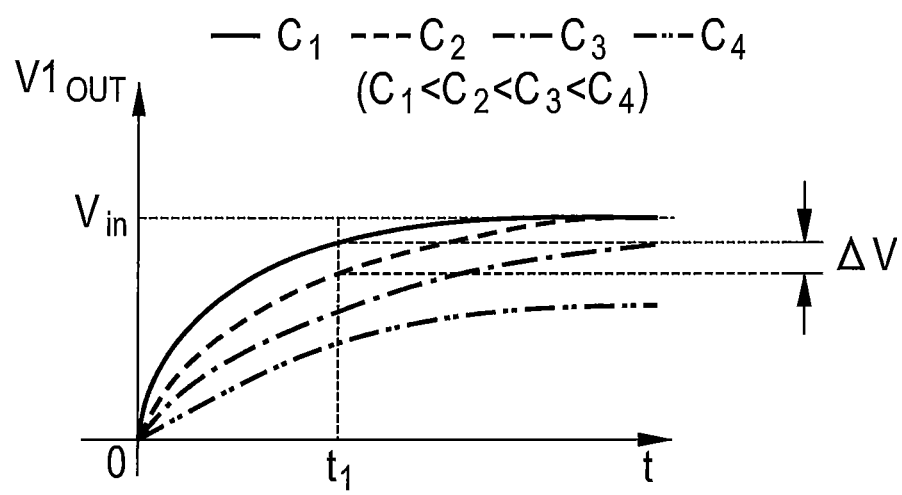
FIG. 9B is a graph showing how each pyroelectric portion is charged in accordance with its electrostatic capacitance during the detection process of FIG. 9A.

Referring to FIG. 9A, when the cover (not shown) of the cartridge accommodating section 40 is opened for replacing the ink cartridge 60 with a new one, a process for detecting the electrostatic capacitance of the pyroelectric portion 71 of the newly mounted ink cartridge 60 is initiated. This process does not proceed, however, until the cover is closed (S1:NO). When the cover is closed (S1:YES), the switch 53 closes the first detection circuit 51 to be operative and the controller 81 controls the first drive circuit 82 to apply a voltage $V_{IN}$ to the first detection circuit 51. The first drive circuit 82 applies the stepped voltage $V_{IN}$ to the first detection circuit 51 (S2). Due to the voltage $V_{IN}$ applied to the pyroelectric portion 71, the latter is gradually charged.

FIG. 9B shows how each pyroelectric portion 71 corresponding to each color is charged depending on the electrostatic capacitance thereof. In FIG. 9B, each pyroelectric portion 71 associated with each color is given an electrostatic capacitance C1, C2, C3 and C4, where C1 is the smallest, while C4 is the greatest. The electrostatic capacitance C1 represents the ink cartridge 60 for black, C2 for yellow, C3 for cyan and C4 for magenta. As shown in FIG. 9B, the voltages $V_{C1-C4}$ outputted from the output terminal $V1_{OUT}$ at time t1 are different from one another depending upon the electrostatic capacitances C1-C4. When the controller 81 detects the voltage $V_{C1-C4}$ at time t1 in S3, in S4 the controller 81 compares the detected voltage $V_{C1-C4}$ associated with each electrostatic capacitance C1-C4 with each first value listed in the first determination table and determines in S5 whether the mounted new ink cartridge 60 is proper.

If the detected voltage $V_{C1-C4}$ does not match any of the first values (S5:NO), the controller 81 determines that the mounted ink cartridge is irrelevant, notifying a user that the irrelevant ink cartridge is mounted, for example, by using a display (S7). If the mounted ink cartridge 60 is determined to be correct (S5:YES), the controller 81 launches various initial operations necessary for the recording apparatus 1 to perform an image recording operation on the recording medium 14, such as positioning of the carriage and an purge operation. At this time, the controller 81 can now move on to the detection of the amount of ink left in the mounted ink cartridge 60 (S6).

Figure 10A:
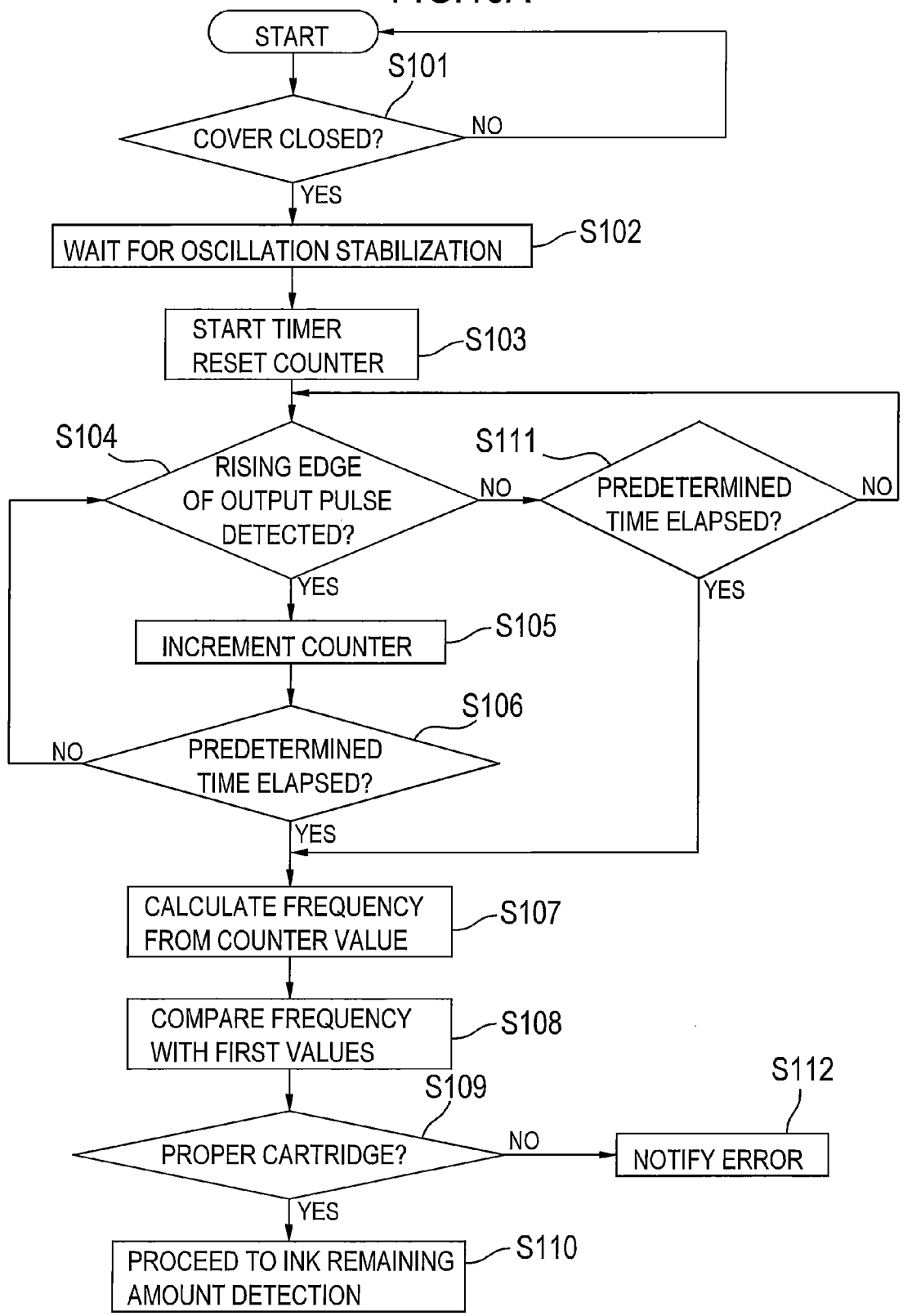
FIG. 10A is a flowchart of a process executed for detecting the electrostatic capacitance of the pyroelectric portion using the first detection circuit of FIG. 7.

Next, the process for detecting the electrostatic capacitance of the pyroelectric portion 71 using the oscillation circuit 54 of FIG. 7 will be described with reference to FIGS. 10A and 10B.

As in the detection process of FIG. 9A, the detection of the electrostatic capacitance using the oscillation circuit 54 is initiated when the cover (not shown) of the cartridge accommodating section 40 is opened. Until the cover is closed, the process does not proceed (S101:NO).

When the cover is closed (S101:YES), the switch 53 closes the oscillation circuit 54 to be operative and the controller 81 controls the first drive circuit 82 to apply a voltage $V_{IN}$ to the oscillation circuit 54 and waits for the oscillation circuit 54 to be stabilized (S102).

Once the oscillation circuit 54 is stabilized, the timer 87 is started and the controller 81 resets the counter 88 (S103). The counter 88 is incremented each time when a rising edge of a pulse is detected (S104, S105), and the controller 81 checks whether a predetermined period of time t2 has elapsed using the timer 87. If the timer 87 indicates that the predetermined period of time t2 has not yet elapsed (S106:NO), the controller 81 moves back to S104 to see whether another rising edge of the pulse is detected, and increments the counter 88 by one when detecting another rising edge of the pulse (S105). In this way, the controller 81 continues the steps S104-S106 until the predetermined period of time t2 has elapsed.

When the predetermined period of time t2 has elapsed (S106:YES), in S107 the controller 81 calculates a frequency (or period) of the pulse trains based on how many times the rising edge of the pulse trains has been counted (i.e. a value of the counter 88) during the predetermined period of time t2.

FIG. 10B shows four kinds of frequencies (waveforms) outputted from the output terminal $V1_{OUT}$ in accordance with each electrostatic capacitance (i), (ii), (iii) and (iv). As described above, each pulse represented by each wave form is outputted in accordance with the electrostatic capacitance of each pyroelectric portion 71. In other words, detecting the frequency (waveform) of each pulse leads to detection of colors of the mounted ink cartridge 60.

The first determination table stores first values each representing each frequency (waveforms (i) through (iv)) and associated with one of the four colors of black, yellow, cyan and magenta. For example, as shown in FIG. 10B, if the pulse trains outputted from the output terminal $V1_{out}$ are detected to have a frequency represented by the waveform (iii), this means that the color of the mounted ink cartridge 60 is determined to be cyan.

In S108, the controller 81 compares the detected frequency (the value of the counter 88) with the first values stored in the first determination table to determine whether the mounted ink cartridge 60 is proper.

If the detected frequency does not match any of the first values (S109:NO), the controller 81 determines that the mounted ink cartridge is irrelevant, notifying a user that the irrelevant ink cartridge is mounted, for example, by using a display (S112). If the mounted ink cartridge 60 is determined to be correct (S109:YES), the controller 81 launches various initial operations necessary for the recording apparatus 1 to perform an image recording operation on the recording medium 14, such as positioning of the carriage and the purge operation. At this time, the controller 81 can now move on to the detection of the amount of ink left in the mounted ink cartridge 60 (S110)

On the other hand, in S104, if no rising edge is detected (S104:NO), whether the predetermined period of time t2 has elapsed is detected in S111. If the predetermined period of time t2 has not yet elapsed (S111:NO), the flow goes back to S104 to see whether the rising edge of the pulse is detected. If no rising edge is detected even after the predetermined period of time t2 has elapsed (S111:YES), the controller 81 jumps to S107 to calculate the frequency of the output pulse.

Figure 11:
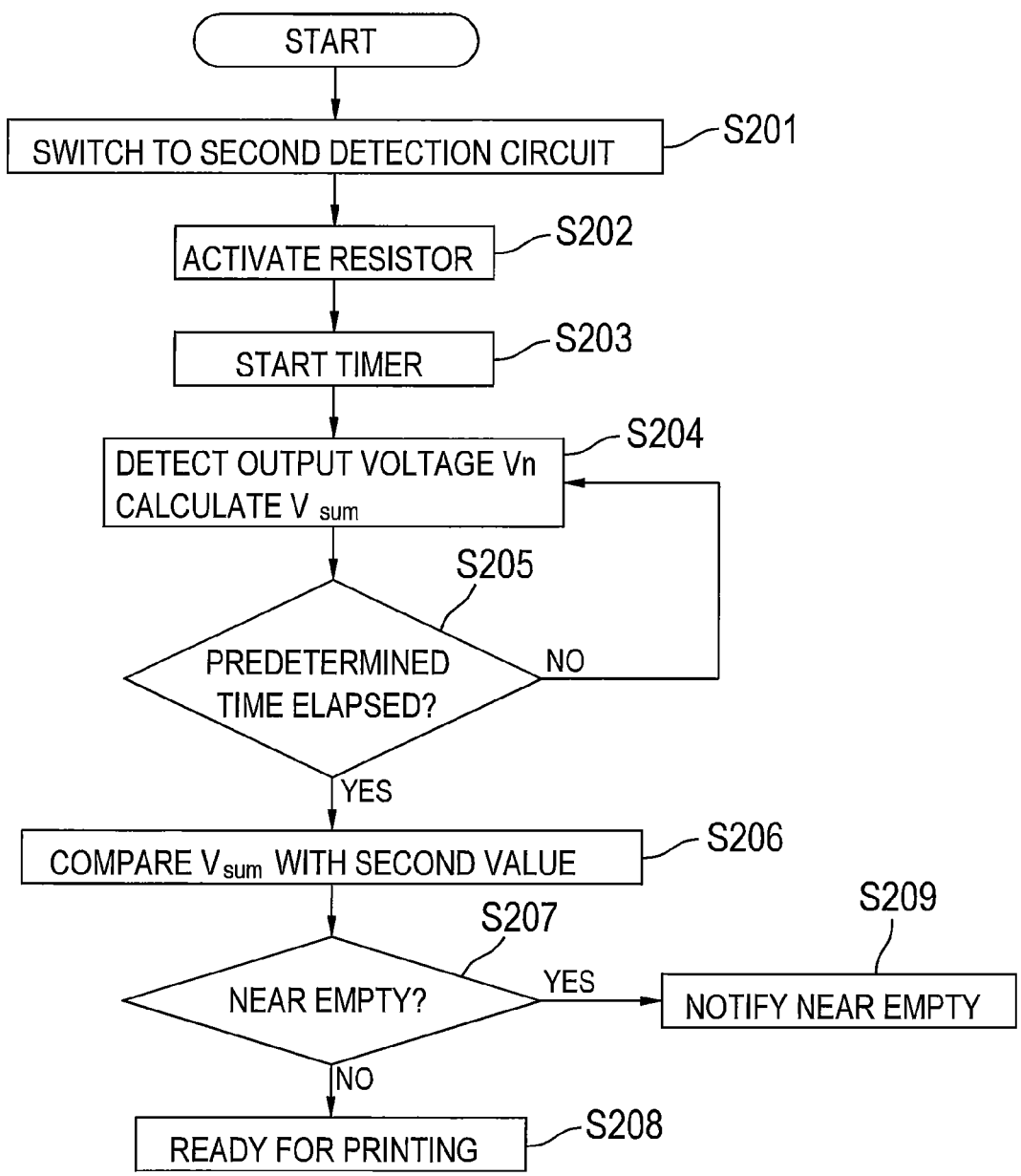
FIG. 11 is a flowchart of a process executed for detecting residual amount of ink in the ink cartridge using the amplifier circuit.

A process to detect the residual amount of ink is configured to be initiated after the ink cartridge 60 mounted in the cartridge accommodating section 40 is determined to be proper (after S6 or S110), or an image forming operation is instructed by the user. Hereinafter, the process for detecting the residual amount of ink will be described with reference to FIG. 11.

When the residual amount of ink detection is initiated, the controller 81 controls the switch 53 such that the pyroelectric portion 71 is connected to the second detection circuit 52 (S201). The controller 81 then controls the second drive circuit 83 to supply power to the resistor 46 (S202). In S203, the timer 87 is started. Once the timer 87 starts to run, in S204 the controller 81 detects a voltage $V_N$ outputted from the output terminal $V2_{OUT}$ and calculates a sum voltage $V_{SUM}$, which is a sum of the latest output voltage $V_N$ and a voltage $V_{N-1}$ outputted immediately before the output voltage $V_N$, until a predetermined period of time t3 has elapsed.

When the predetermined period of time t3 elapsed (S205: YES), the controller 81 compares the sum voltage $V_{SUM}$ with the second value (threshold value) stored in the second determination table in S206 to determine whether or not the residual amount of ink is smaller than a prescribed amount (i.e., whether or not the ink cartridge 60 is near empty). The sum voltage $V_{SUM}$ becomes greater than the second value in S207 when the residual amount of ink is smaller than the prescribed amount since the liquid surface of the ink left in the mounted ink cartridge 60 falls below the bottom end of the protruding portion 78B of the heat conductor 78 (i.e., the heat conductor 78 is exposed from the ink). In other words, the heat generated at by the resistor 46 is no longer absorbed by the ink, but is conducted to the pyroelectric portion 71 via the sensor board 74.

When the sum voltage $V_{SUM}$ is smaller than or equal to the second value (S207:NO), the controller 81 determines in S208 that there still remains enough amount of ink in the mounted ink cartridge 60. The recording apparatus 1 can therefore perform the image recording operation in accordance with instructions inputted by an input button (not shown) or via an external device such as a personal computer.

On the other hand, when the sum voltage $V_{SUM}$ is greater than the second value (S207:YES), the controller 81 determines that the residual amount of ink is smaller than the prescribed amount (the mounted ink cartridge 60 is near empty). The controller 81 therefore informs the user in S209 that the ink is running out soon and prompts replacement of the mounted ink cartridge 60. When determining that the residual amount of ink is less than the prescribed amount, the controller 81 starts performing a well-known dot-counting, i.e., counting how many dots have been printed, in order to grasp how much more ink is left until the ink is used up. Alternatively, the user may be notified, by the display for example, that the amount of ink is determined to be actually empty.

As described above, the recording apparatus 1 according to the embodiment can distinguish types of the mounted cartridges 60 by detecting the electrostatic capacitance of the pyroelectric portion 71 of each ink cartridge 60. The recording apparatus 1 of the present embodiment can also determine whether the amount of ink left in each ink cartridge 60 is less than the prescribed amount by detecting the output voltage of the pyroelectric portion 71 when the resistor 46 is applied with a current. In other words, the recording apparatus 1 of the present embodiment can determine both the type and the residual amount of ink in each ink cartridge 60 based on information only from the pyroelectric portion 71.

Further, since the heat from the resistor 46 is conducted to the sensor board 74 of each ink cartridge 60 via the thermal conductor 47, the recording apparatus 1 of the present embodiment can have a simpler configuration compared to other configurations such as those in which a resistor is disposed for each cartridge accommodating section 40, or those in which a resistor and electrical interfaces are provided for each ink cartridge 60. In other words, the recording apparatus 1 of the present embodiment can determine whether the residual amount of ink in each ink cartridge 60 is less than or not less than the prescribed amount with a simple configuration.

Further, the circuit patterns P connected to the pyroelectric portion 71 (the film electrodes 73A, 73B) can also serve to conduct heat from the resistor 46 to the pyroelectric portion 71. Therefore, the sensor board 74 can have a simplified configuration.

Further, the thermal conductor 47 is made of a metal plate and the insulating members 48 are attached to the thermal conductor 47. Therefore, high thermal conductivity and high insulating performance can be achieved both at the same time.

Note that, when the thermal conductor 47 is brought into contact with only one of the circuit patterns P connected to the film electrode 73A that is virtually grounded, the insulating member 48 is not necessary.

Further, although the recording apparatus 1 according to the embodiment detects whether or not the residual amount of ink is less than the predetermined amount, the recording apparatus 1 may be configured to determine the residual amount of ink at multiple stages instead of one. In this case, the second determination table prestores a plurality of predetermined values (second values) associated with a plurality of levels of the amount of ink in the ink cartridge 60.

Further, instead of the resistor 46, a material capable of generating heat when applied with a current, or an infrared ray emitter such as an infrared-ray emitting diode may be used as a heater.

Figure 12:
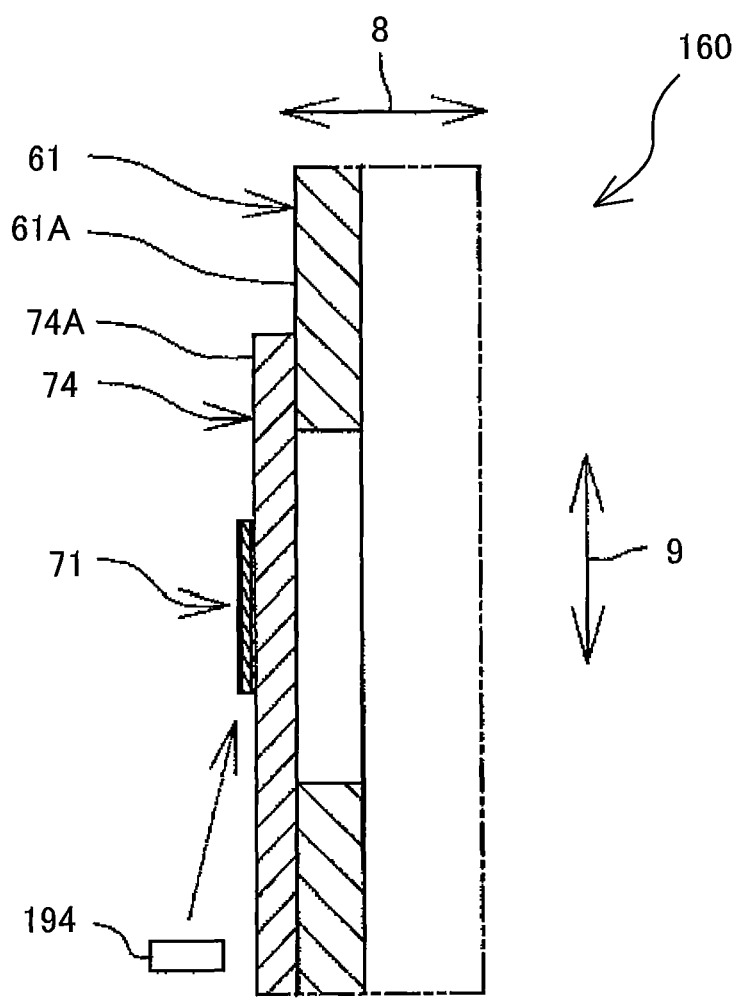
FIG. 12 is a partially-enlarged vertical cross-sectional view of an ink cartridge according to a modification of the embodiment.

FIG. 12 shows an ink cartridge 160 according to a modification of the present embodiment. An infrared-ray emitting diode 194 is provided on the cartridge accommodating section 40. The infrared-ray emitting diode 194 is adapted to irradiate infrared ray directly toward the pyroelectric portion 71, more specifically, to the film electrode 73A (the top surface of the pyroelectric portion 71) or to a side surface of the pyroelectric portion 71.

The sensor board 74 is disposed such that the sensor board 74 is in direct contact with the ink accommodated within the ink chamber when the amount of ink is sufficient. Therefore, heat generated at the pyroelectric portion 71 due to incidence of the infrared ray thereon can be released to the ink via the sensor board 74. Alternatively, the heat conductor 78 may also be provided within the ink cartridge 160, as in the embodiment. If this is the case, the heat generated at the pyroelectric portion 71 due to incidence of infrared ray is released to the ink via the sensor board 74 and the heat conductor 78.

In this modification, a control circuit 180 includes a diode drive circuit (not shown), instead of the second drive circuit 83, for driving the infrared-emitting diode 194. The diode drive circuit can be a constant voltage circuit or a constant current circuit.

When detecting the residual amount of ink in the ink cartridge 160, the controller 81 drives the infrared-ray emitting diode 194 to irradiate infrared ray toward the pyroelectric portion 71, as shown in a dotted line in FIG. 12. When there is enough ink left in the ink cartridge 160, the pyroelectric portion 71 can be cooled down by the ink even if the pyroelectric portion 71 is applied with heat resulting from incidence of infrared ray on the pyroelectric portion 71. Therefore, there is little change in temperature of the pyroelectric portion 71, and few output voltage is developed at the pyroelectric portion 71.

When the amount of ink decreases to fall below the prescribed amount, the pyroelectric portion 71 no longer contacts the ink and therefore cannot be cooled down by the ink. As a result, the temperature of the pyroelectric portion 71 starts rising and the polarization structure of the pyroelectric portion 71 is caused to change, developing a voltage between the film electrodes 73A, 73B. In this way, the voltage outputted from the pyroelectric portion 71 changes in accordance with a change in the amount of ink in the ink cartridge 160. The controller 81 detects the output voltage of the pyroelectric portion 71 by using the second detection circuit 52, and determines how much ink is left in the ink cartridge 160. Determination on the type of the ink cartridge 160 is performed in the same manner as in the embodiment.

Although the present invention has been described with respect to the specific embodiment and modifications, it will be appreciated by one skilled in the art that a variety of changes may be made without departing from the scope of the invention.

What is claimed is:

1. A recording apparatus comprising:
    a cartridge accommodating section in which an ink cartridge of a predetermined type is mountable, the ink cartridge including:
        an ink chamber configured to store ink therein;
        a first heat conductor configured to conduct heat to the ink;
        a pyroelectric portion configured to output an electrical signal; and
        a first electrical interface connected to the pyroelectric portion,
    the cartridge accommodating section including:
        a second electrical interface connectable to the first electrical interface when the ink cartridge is mounted in the cartridge accommodating section;
        a heater configured to apply heat; and
        a second heat conductor configured to conduct heat to the first heat conductor when the ink cartridge is mounted in the cartridge accommodating section; and
        a controller configured to determine at least one of the type of the ink cartridge mounted in the cartridge accommodating section and whether an amount of ink in the ink chamber is less than a predetermined amount based on the electrical signal inputted from the pyroelectric portion via the second electrical interface.

2. The recording apparatus according to claim 1, wherein the pyroelectric portion and the first electrical interface are mounted on a printed circuit board and are electrically connected to each other via a circuit pattern, and
    wherein the second heat conductor has a portion that is brought into contact with the circuit pattern when the ink cartridge is mounted in the cartridge accommodating section, the portion being made of an electrically insulating material.

3. The recording apparatus according to claim 1, wherein the heater is a resistor mounted on the second heat conductor, the pyroelectric portion outputting a first signal indicative of the amount of ink in the ink chamber in response to the amount of heat applied from the resistor and preserved in the pyroelectric portion, the controller determining whether the amount of ink in the ink cartridge is less than the prescribed amount based on the first signal outputted from the pyroelectric portion via the second electrical interface when the ink cartridge is mounted in the cartridge accommodating section.

4. The recording apparatus according to claim 1, wherein the heater is an infrared ray emitting diode configured to emit infrared ray toward the pyroelectric portion, the pyroelectric portion outputting a first signal indicative of the amount of ink in the ink chamber in response to the amount of heat applied upon incidence of the infrared ray from the infrared ray emitting diode and preserved in the pyroelectric portion, the controller determining whether the amount of ink in the ink cartridge is less than the prescribed amount based on the first signal outputted from the pyroelectric portion via the second electrical interface.

5. The recording apparatus according to claim 1, wherein the pyroelectric portion is given a predetermined electrostatic capacitance, the pyroelectric portion outputting a second signal indicative of the predetermined electrostatic capacitance when the ink cartridge is mounted in the cartridge accommodating section, the controller determining the type of the ink cartridge based on the second signal outputted from the pyroelectric portion via the second electrical interface.

* * * * *